Dec. 11, 1962   A. G. GRIMAILA   3,068,467
PERIPHERY PLOT CONVERTER
Filed Dec. 12, 1958
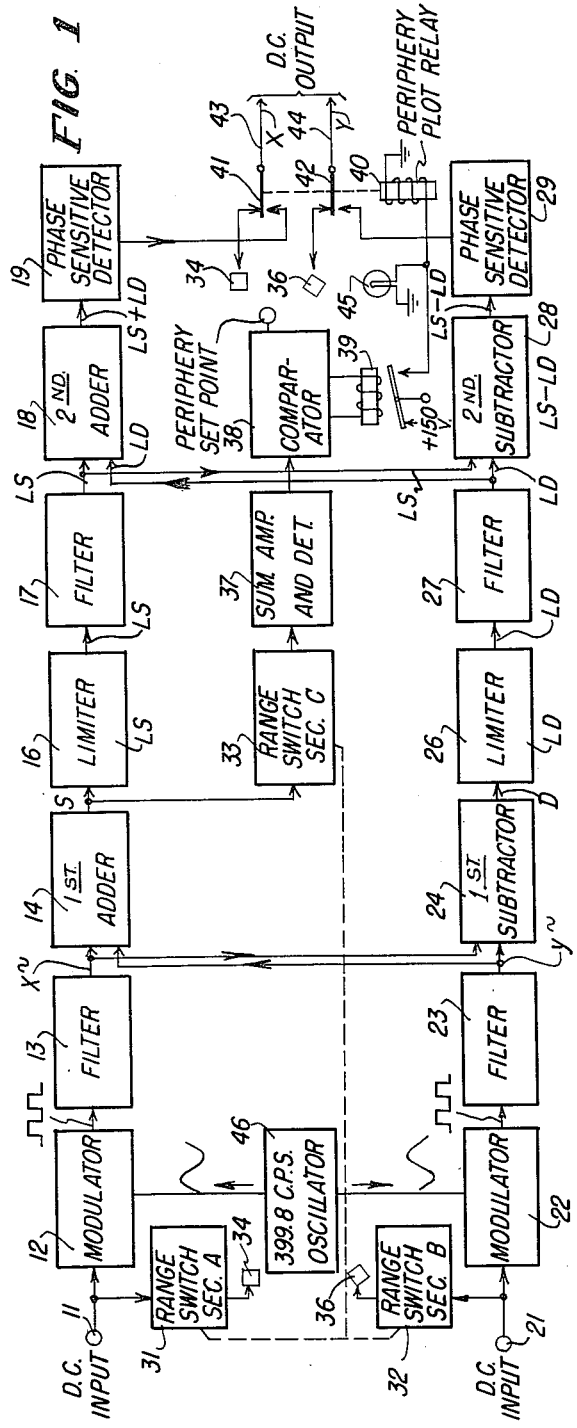
INVENTOR.
Algert G. Grimaila
BY Mueller & Aichele
Attys.

United States Patent Office 3,068,467
Patented Dec. 11, 1962

3,068,467
PERIPHERY PLOT CONVERTER
Algert G. Grimaila, Phoenix, Ariz., assignor to Motorola, Inc., Chicago, Ill., a corporation of Illinois
Filed Dec. 12, 1958, Ser. No. 779,914
6 Claims. (Cl. 343—5)

This invention relates to range display systems and more particularly to electronic apparatus for use with such systems to indicate the detection of a target or the like which is beyond a predetermined display range.

In electronic range indicating and display systems, such as radar, it is customary to provide a generally circular plotting board or screen with the signal-emitting point as its center with the presence of detected targets or similar objects indicated on the screen in relation to such center. Such plotting boards are generally provided with calibrated scales so that the distance of the target from the signal-emitting point may be read directly. Frequently, the scales are adjustable so that areas of different radial size may be indicated on a single board, that is, areas of a radius of five, ten or twenty miles, for example.

In some situations, a target or similar object may be detected, for example, eighteen miles from the signal-emitting reference point with another target being detected at a distance of three miles. When the plotting board scale is set to the five mile range, the closer target can be observed accurately as desired but the presence of the more distant target is not indicated. In many instances, it is advantageous for an observer to be aware of the presence of the more distant target without the necessity of using a relatively large scale on which the position of the closer target could not be read with the accuracy desired. In such instances, it would be convenient to have a general indication of the presence of the more distant target and also its accurate bearing or azimuth with respect to the observer.

It is an object of the present invention to provide a display system for an electronic range and bearing detector effective for indicating the presence of a target or similar object beyond the preset indicating range of the system while permitting simultaneous detailed observation of targets within the selected range.

It is a further object of the invention to provide a radar display system for indicating peripherally the azimuth or bearing of targets outside a preset range of the display system.

A feature of the invention is the provision of electronic means for converting D.C. analogue voltages from a data source to equivalent sine wave A.C. signals which are subsequently added and subtracted vectorially to provide a converted signal. This signal is indicated on a plotting board at its proper azimuth in a peripheral area indicating that its true position places it beyond the normal plotting range of the display system.

Another feature of the invention is a provision of a range switch in connection with a radar display system which switch is effective to feed converted information to plotting means if the vectorial sum of input signals thereto is greater than a predetermined value.

Another feature of the invention is the provision of electronic means for limiting the amplitudes of sums and differences of the aforesaid converted sine wave signals and subsequently adding and subtracting these limited sum and difference signals to obtain equivalent A.C. signal convertible to D.C. abscissa and ordinate outputs indicating an out-of-range target at the periphery of the display system on its true azimuth.

In the accompanying drawings:
FIG. 1 is a block diagram illustrating the connection of the electronic circuit units of a plotting system in accordance with the present invention;

FIG. 2 is a diagrammatic illustration of a plotting board or display scope used in connection with the present invention and illustrating graphically various vectorial quantities discussed in connection with the ensuing description; and FIG. 3 is an illustration of a plotting board on which the positions of a plurality of targets both within and without the preset range are displayed.

In accordance with the present invention a display is provided which indicates targets beyond the normal displayed range. Electronic apparatus is provided for converting D.C. analogue voltages indicative of the X and Y coordinates of the position of a detected target to equivalent sine wave A.C. signals 90° out of phase. These A.C. signals are vectorially added and vectorially subtracted to provide sum and difference signals. A range switch senses the magnitude of the sum signal and, if it is within a preselected range, the D.C. analogue voltages are indicated directly on a display device. However, if the sum is beyond the preselected range, the sum and difference signals are converted to limited signals of the magnitude of the preselected range but with characteristic phase vectors. Subsequently, the limited sum and limited difference are added to and subtracted from one another to provide converted signals which can be indicated on the periphery of the display device to indicate a point having the same bearing or azimuth as the detected out-of-range target. In this way, the observer of the display device may use a large scale setting to observe the movement of nearby targets but may be aware of the presence and correct azimuth of more distant targets.

The block diagram of FIG. 1 illustrates schematically the connection of various electronic units making up the system. An input terminal 11 is provided to receive a D.C. analogue voltage from a data source (not shown) such as is included in a radar data processing system. The magnitude of this voltage is proportional to the distance of a detected target from a reference point along the X or east-west direction. The input terminal is serially connected to a modulator unit 12, a filter 13, a first adder circuit 14, a limiter 16, a filter circuit 17, a second adder circuit 18 and a phase detector 19. A parallel and generally symmetrical branch is connected to the Y or north-south input terminal 21 and this branch includes corresponding units except that a subtractor circuit 24 is interposed between the filter 23 and the limiter 26. Also, a second subtractor circuit 28 is provided between the filter circuit 27 and the phase detector 29.

A range limiting switch having three sections designated as 31, 32 and 33 is included in the system. Sections 31 and 32 are connected between the input terminals and contacts 34 and 36 which contacts are coupled directly to the activating means on the display system. The section 33 is connected between the adder section 14 and a sum amplifier and detector 37 which has its output coupled to a comparator circuit 38. Switch sections 31, 32 selectively scale the X and Y input voltages, initially received from the analogue voltage data source in terms of volts per mile, to match the fixed sensitivity of the display device, set in terms of inches per volt. This allows selection of full scale deflection for any given maximum range. Switch sections 33, ganged with sections 31, 32 similarly scales the output of first adder 14, which is also in terms of volts per mile, to produce a corresponding voltage change in the signal coupled to comparator circuit 38. A relay 39, activated by the comparator circuit 38, is coupled to the periphery plot relay winding 40 and actuates the switches 41 and 42 to establish contact between the phase detectors 19 and 29 and the output terminals 43 and 44 respectively.

An oscillator 46 is connected to the two modulators 12 and 22 and applies sine waves having a 90° phase relation thereto. The modulators provide square wave carrier signals 90° out of phase from one another at the output of the modulators which have amplitudes which are controlled as will be described.

In operation of the system, a D.C. analogue voltage indicative of the X coordinate or generally east-west position of a target with respect to an observer is received from a data source at the terminal 11 and is accepted by the modulator stage 12. The oscillator stage 46 generating an A.C. signal of predetermined frequency feeds a reference carrier to each modulator stage. These are balanced modulators driven to produce a square wave output whose amplitude is proportional to the D.C. input voltage and of corresponding polarity. The D.C. input voltage at terminal 11 controls the carrier signal. For example, a zero D.C. input results in a zero output from the modulator, a positive D.C. input results in a positive square wave output (i.e., relative to its carrier) and a negative D.C. input results in a negative square wave output (also relative to its carrier). The output of the modulator 12 is fed to the filter circuit 13 which converts it to an output signal which is the sine wave equivalent of the D.C. input voltage at terminal 11. In the Y branch of the system, analogous action takes place with a D.C. analogue voltage indicative of the Y or north-south coordinate of a target being received at terminal 21 and converted to an equivalent sine wave output signal by means of the modulator 22 and a filter 23. The carrier signal fed from the oscillator 46 to the modulator 22 is 90° out of phase with the signal fed to modulator 12 so that the sine wave outputs of filters 13 and 23 are 90° out of phase for equal signals at 11 and 21.

The outputs from each of the filters 13 and 23 are fed to the first adder stage 14 which is in the X branch of the circuit as shown and to the first subtractor 24 which is in the Y branch of the circuit. The adder 14 serves to vectorially add the X and Y sine output signals to provide a signal designated as S. This vector quantity is indicated on the plotting board diagram of FIG. 2 at a point beyond the normal display range of the board. The sum signal S is accepted by the section 33 of the range switch and by the sum amplifier and detector stage 37 from which it passes to the comparator circuit 38. If the magnitude of the signal S is greater than the display limit of the plotting board, the comparator circuit becomes unbalanced and closes relay 39 which in turn activates the peripheral plot relay 40 with a result that will be explained subsequently.

Assuming that the sum signal S is beyond the preselected display range, the signal is accepted by the limiter 16 which converts it to a square wave signal of the same phase but smaller predetermined magnitude LS also indicated on the diagram of FIG. 2. Consequently, this limited magnitude is equal to one half of the maximum display radius of the plotting board. This signal passes through a second filter stage 17 to produce a suitable limited sine wave output signal.

The X and Y signals from filters 13 and 23 are also combined in the subtractor stage 24 which produces a difference signal D equal in magnitude to the sum signal S but of a different phase as shown in FIG. 2. The difference signal D is likewise accepted by a limiter stage 26 which limits its magnitude to the same amplitude as the limited sum signal LS. The limited signal is filtered in the stage 27 to produce a limited sine wave difference signal LD. Since this signal is limited and filtered to the same extent as the limited sum signal LS, they are of the same magnitude.

The limited sum and limited difference signals are both fed into the second adder stage 18 where they are vectorially added and to the second subtractor stage 28 where they are vectorialy subtracted to produce signals LS plus LD and LS minus LD, respectively. The sum signal from the second adder stage 18 has a magnitude equal to the display limit of the plotting board times the cosine of the azimuth angle of the target as originally detected. The difference signal LS minus LD produced by the second subtractor stage 28 is equal to the same magnitude times the sine of the azimuth angle. The sum signal is passed to a phase sensitive detector 19 which uses sine $\omega t$ as a reference where $\omega$ is the frequency of the oscillator 46 and $t$ is time. The detector is phase sensitive thus preserving the polarity of the recovered voltage and converting it to a D.C. output voltage recovered at output terminal 43 because the relay 40 is closed and the contact 41 is connected to the phase detector 19.

The difference signal LS minus LD from the subtractor stage 28 is similarly accepted by a phase sensitive detector 29 which uses cosine $\omega t$ as a reference. This produces a D.C. voltage recovered at the output 44 because of the connection between contact 42 and the phase detector 29. The signals recovered at 43 and 44 activate a conventional plotting mechanism with the signal detected at terminal 43 controlling the X output coordinate and that at 44 controlling the Y coordinate. The magnitude of the result signal will be twice the predetermined limiting level LS or LD but the azimuth thereof will be the same as the azimuth of the original detected signal which was beyond the normal display range. Thus, the target will be portrayed on the periphery of the plotting board at the point $P_1$ as shown in FIG. 2, on the same bearing as the original target. In order to minimize confusion of such peripheral plots with those of targets detected near the limit of the plotting range, the display board may be provided with a signal lamp 45 which is lit by closing of the peripheral plot relay 40 to indicate that a target is being detected beyond the normal display range.

In the event the sum signal S derived from the first adder stage 14 is less than the selected display range so that the target could be portrayed in the normal display area of the plotting board the relay 40 remains open so that the output terminals 43 and 44 are electrically connected to terminals 34 and 36 which receive the original X and Y input voltages from input terminals 11 and 12, respectively. Since the voltage at which comparator 38 is set to operate is determined by the fixed sensitivity of the display device, range limiting switch sections 31, 32 and 33 insure that for any predetermined range full sensitivity display is utilized when the sum signal S is less than a selected range, yet allow peripheral plot relay 40 to be activated by comparator 38 if such a range is exceeded. Sections 31 and 32 scale the input X and Y signals to match the display sensitivity when such signals are directly applied to the display device through contacts 34, 36, while section 33 correspondingly matches the output S of first adder 14 to the set level of comparator 38.

The signals derived at output terminals 43 and 44 are used to activate a conventional plotting mechanism (not shown) which indicates the positions of various detected targets on the display board as by making chalk marks. FIG. 3 illustrates the appearance of a plotting board in a typical situation wherein the presence of targets both within and without a selected range is indicated. The central portion 50 of the board indicates an area within a predetermined radius of the observation point 51 and points 52 indicate the position of targets within that range. The relative positions of such targets is accurately indicated by the scales 53 and 54. This annular peripheral area 60 is marked at points 61 indicating the presence of targets beyond the range area 50 and at their true azimuth with respect to observation point 51. During the condition of peripheral plotting the lamp 45 attached to the plotting board is turned on so that observers will realize that points 61 indicate targets beyond the selected plotting range.

The relation of the quantities manipulated in the various adder and subtractor stages of the system to the coordinates of the target as originally detected and as displayed will be more evident from a consideration of a mathematical analysis of these quantities set forth below where:

P is the received range coordinate,
$P_1$ is the substituted range coordinate which falls within the periphery plot,
$\theta$ is the azimuth coordinate, and
$\omega$ is the carrier frequency of the oscillator stage.

Then the following relations exist:

$$X^{(dc)} = P \cos \theta$$
$$Y^{(dc)} = P \sin \theta$$
$$X^{(sine\ wave)} = P \cos \theta \sin \omega t$$
$$Y^{(sine\ wave)} = P \sin \theta \cos \omega t$$
$$S^{(sum)} = P \sin (\omega t + \theta)$$
$$P = S \text{ (detected)}$$
$$D^{(difference)} = P \sin (\omega t - \theta)$$
$$LS = \frac{P_1}{2} \sin (\omega t + \theta)$$
$$LD = \frac{P_1}{2} \sin (\omega t - \theta)$$
$$LS + LD \text{ (detected)} = \frac{P_1}{2}[\sin (\omega t + \theta) + \sin (\omega t - \theta)]$$
$$= P_1 \cos \theta \sin \omega t$$
$$LS - LD \text{ (detected)} = \frac{P_1}{2}[\sin (\omega t + \theta) - \sin (\omega t - \theta)]$$
$$= P_1 \sin \theta \cos \omega$$

$X_1$(periphery plot X coordinate)
$$= (LS + LD) \text{ detected} = P_1 \cos \theta$$
$Y_1$(periphery plot Y coordinate)
$$= (LS - LD) \text{ detected} = P_1 \sin \theta$$

$(LS+LD)$ detected is obtain in a phase sensitive detector with sin $\omega t$ as reference and $(LS-LD)$ detected is obtained in a phase sensitive detector with cos $\omega t$ as reference.

The present invention thus provides a system for indicating the presence of targets beyond the selected display range of a navigational aid system while showing these targets at their true bearing with respect to the observer. In this way, it is possible to concentrate the system on a relatively small area for intensive observation while at the same time detecting the presence and true bearing of the targets beyond such area. This is of substantial convenience in navigation and permits the employment of scales of convenient magnitude on plotting boards or analogous display devices.

I claim:

1. Apparatus for use in indicating on a display means the presence of a target beyond a selected range, said apparatus including in combination, first input means for receiving a D.C. voltage signal indicative of the X coordinate of a detected target, second input means for receiving a D.C. voltage signal indicative of the Y coordinate of said target, means for converting the D.C. voltage signals received by each said input means to sine wave A.C. signals differing in phase by 90° and having amplitudes proportional respectively to the amplitudes of the received D.C. signals, means for vectorially adding said A.C. signals to provide a first sum signal, means responsive to said first sum signal for feeding said D.C. voltage signals directly to said display means if said sum signal is less than a predetermined value, and means operative only if said sum signal exceeds said predetermined value for translating said A.C. signals to converted D.C. output signals indicative of the azimuth of said detected target.

2. Apparatus for use in indicating on a display means the presence of a target beyond a selected range, said apparatus including in combination, first input means for receiving a D.C. voltage signal indicative of the X coordinate of a detected target, second input means for receiving a D.C. voltage signal indicative of the Y coordinate of said target, means for converting said D.C. voltage signals to sine wave A.C. signals differing in phase by 90° and having amplitudes proportional respectively to the amplitudes of the received D.C. signals, means for vectorially adding said A.C. signals to provide a first sum signal, means for vectorially subtracting said A.C. signals to provide a first difference signal, means responsive to said first sum signal for feeding said D.C. voltage signals directly to said display means in response to a sum signal having a value less than a predetermined value, means for limiting the magnitudes of said sum and difference signals to a selected value, means for vectorially adding and subtracting said limited sum and limited difference signals, and means for translating the resulting sum and difference signals to D.C. output signals indicative of the azimuth of said detected target, said translating means being operative only in response to a first sum signal which exceeds said predetermined value.

3. Apparatus for use in a radar system in indicating on a display means the presence of target beyond a selected range, said apparatus including in combination, first input means for receiving a D.C. voltage signal indicative of the X coordinate of a detected target, second input means for receiving a D.C. voltage signal indicative of the Y coordinate of said target, means for converting said D.C. voltage signals to sine wave A.C. signals differing in phase by 90° and having amplitudes proportional respectively to the amplitudes of the received D.C. signals, means for vectorially adding said A.C. signals to provide a first sum signal, means for vectorially subtracting said A.C. signals to provide a first difference signal, means responsive to said first sum signal for feeding said D.C. voltage signals directly to said display means if said first sum signal is less than a predetermined value, means for limiting the magnitude of said first sum and difference signals to a selected value to provide limited sum and limited difference sine wave signals, means for vectorially adding and subtracting said limited sum and limited difference signals, phase sensitive detector means for translating the vectorial sum and difference of said limited sum and limited difference signals to D.C. output signals indicative of the azimuth of said target, and relay means sensitive to the magnitude of said first sum signal for operatively connecting said phase detector means to the display means if said first sum signal exceeds a predetermined value.

4. Apparatus for indicating the presence of a target beyond a predetermined range, said apparatus including in combination, a display device including a central portion and a peripheral portion, first input means for receiving a D.C. voltage signal indicative of the X coordinate of a detected target, second input means for receiving a D.C. voltage signal indicative of the Y coordinate of said target, means for converting the D.C. voltage signals received by each said input means to sine wave A.C. signals differing in phase by 90° and having amplitudes proportional respectively to the amplitudes of the received D.C. signals, means for vectorially adding said A.C. signals to provide a first sum signal, means responsive to said first sum signal for feeding said D.C. voltage signals directly to said display device if said sum signal is less than a predetermined value and means for translating said A.C. signals to D.C. output signals indicative of the azimuth of said detected target to display said target at its true azimuth in said peripheral portion of said display device when the target is beyond a predetermined range.

5. Means for indicating the detection of a target at a greater distance than the selected range of a radar display system including in combination, first input means for receiving a D.C. voltage indicative of the X coordinate of the position of a detected target, second input means for receiving a D.C. voltage indicative of the Y coordinate of said target, means for converting each of said D.C.

voltages to sine wave signals differing in phase by 90° and having amplitudes proportional to the amplitude of the D.C. voltages, means for vectorially adding and subtracting said sine wave signals to produce a first sum signal and a first difference signal, means for limiting said first sum signal to provide a limited sum signal, means for limiting said first difference signal to provide a limited difference signal, means for vectorially adding said limited sum signal and said limited difference signal to provide a second sum signal indicative of the X coordinate of a converted target indication, means for vectorially subtracting said limited sum signal and said limited difference signal to provide a second difference signal indicative of the Y coordinate of said converted target indication and means for translating said second sum and difference A.C. signal into D.C. voltages.

6. Means for indicating the detection of a target at a greater distance than the selected range of a radar display system including in combination, first input means for receiving a D.C. analogue voltage indicative of the X coordinate of the position of a detected target, second input means for receiving a D.C. analogue voltage indicative of the Y coordinate of said target, osciliator means for providing a first A.C. carrier signal and a second A.C. carrier signal displaced 90° from the first, means for modulating said first A.C. carrier signal by said D.C. voltage indicative of the X coordinate and for filtering the modulated signal to produce a first sine wave signal, means for modulating said second A.C. carrier signal by said D.C. voltage indicative of the Y coordinate and for filtering the modulated signal to produce a second sine wave signal, means for vectorially adding and subtracting said sine wave signals to produce a first sum signal and a first difference signal, means for limiting said first sum signal to provide a limited sum signal, means for limiting said first difference signal to provide a limited difference signal, means for vectorially adding said limited sum signal and said limited difference signal to provide a second sum signal indicative of the X coordinate of a converted target indication, means for vectorially subtracting said limited sum signal and said limited difference signal to provide a second difference signal indicative of the Y coordinate of said converted target indication, means for translating said second sum and difference A.C. signal into D.C. voltages.

No references cited.